(12) United States Patent
Rael

(10) Patent No.: US 8,735,779 B2
(45) Date of Patent: *May 27, 2014

(54) MAGNETIC SAFETY FEATURE FOR COOKWARE AND COOKING STOVES

(76) Inventor: Paul J. Rael, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/452,155

(22) Filed: Apr. 20, 2012

(65) Prior Publication Data

US 2012/0261424 A1 Oct. 18, 2012

Related U.S. Application Data

(63) Continuation of application No. 12/710,263, filed on Feb. 22, 2010, now Pat. No. 8,164,029, and a continuation of application No. 12/040,056, filed on Feb. 29, 2008, now Pat. No. 7,667,161, and a continuation of application No. 11/467,856, filed on Aug. 28, 2006, now Pat. No. 7,355,151, and a continuation of application No. 10/862,979, filed on Jun. 8, 2004, now Pat. No. 7,135,658.

(51) Int. Cl.
*H05B 3/68* (2006.01)
*A47J 27/00* (2006.01)

(52) U.S. Cl.
USPC ........ 219/446.1; 219/620; 219/518; 366/197; 126/373.1

(58) Field of Classification Search
USPC ........ 219/446.1, 620–2, 443.1, 447.1, 518–9, 219/489; 366/197, 273–4; 126/92, 90 A, 126/92 A, 27, 373.1, 211, 217
See application file for complete search history.

(56) References Cited

U.S. PATENT DOCUMENTS

| | | | |
|---|---|---|---|
| 3,796,850 A | | 3/1974 | Moreland, II et al. |
| 3,979,572 A | * | 9/1976 | Ito et al. ........................ 219/621 |
| 4,155,343 A | | 5/1979 | Hartman |
| 4,314,543 A | | 2/1982 | Bullington et al. |
| 4,517,955 A | | 5/1985 | Ehrlich et al. |
| 4,836,181 A | | 6/1989 | Saga |
| 4,934,333 A | | 6/1990 | Ducate, Jr. et al. |
| 5,575,445 A | | 11/1996 | Kozdas |

(Continued)

OTHER PUBLICATIONS

Office Action dated Nov. 17, 2004 for related U.S. Appl. No. 10/862,979, filed Jun. 8, 2004, Inventor: Paul J. Rael, (7 pages).

(Continued)

*Primary Examiner* — Shawntina Fuqua
(74) *Attorney, Agent, or Firm* — Vista IP Law Group LLP

(57) ABSTRACT

Methods and devices for securing an item of cookware to the burner of a stove top by use of magnetism. The magnet(s) may be permanent magnets or electromagnets. The cookware may comprise a permanent magnet disposed on or in the base of the cookware. The burner comprises a magnetic material such as steel or iron. The magnetic material may be in the grate of the cook top, in the electric coil of an electric burner, in the surface of a smooth-top stove top, or any other component of the cook top which is in close proximity to the bottom of the cookware when it is placed on the cooking surface. When the cookware is placed on the stove top, the magnetic field of the permanent magnet creates a force on the magnetic material biasing the cookware against the stove top and securing the cookware to the cook top.

13 Claims, 3 Drawing Sheets

(56) References Cited

U.S. PATENT DOCUMENTS

| | | | |
|---|---|---|---|
| 5,750,963 A | | 5/1998 | Christensen et al. |
| 6,031,209 A | * | 2/2000 | Wiesman .................. 219/447.1 |
| 6,044,834 A | | 4/2000 | Zappetti |
| 6,145,432 A | | 11/2000 | Bellue, Jr. |
| 6,207,933 B1 | | 3/2001 | Stedron et al. |
| 6,255,628 B1 | | 7/2001 | Perrino |
| 6,300,603 B1 | * | 10/2001 | Edwards et al. ........... 219/447.1 |
| 6,517,037 B1 | | 2/2003 | Munoz |
| 6,698,420 B2 | | 3/2004 | Anthony |
| 7,135,658 B2 | | 11/2006 | Rael |
| 2006/0283437 A1 | | 12/2006 | Rael |

OTHER PUBLICATIONS

Amendment dated Feb. 16, 2005 for related U.S. Appl. No. 10/862,979, filed Jun. 8, 2004, Inventor: Paul J. Rael, (9 pages).
Notice of Non-Compliant Amendment dated Feb. 28, 2005 for related U.S. Appl. No. 10/862,979, filed Jun. 8, 2004, Inventor: Paul J. Rael, (1 page).
Amendment dated Mar. 25, 2005 for related U.S. Appl. No. 10/862,979, filed Jun. 8, 2004, Inventor: Paul J. Rael, (5 pages).
Office Action dated Aug. 24, 2005 for related U.S. Appl. No. 10/862,979, filed Jun. 8, 2004, Inventor: Paul J. Rael, (10 pages).
Amendment dated Jan. 24, 2006 for related U.S. Appl. No. 10/862,979, filed Jun. 8, 2004, Inventor: Paul J. Rael, (8 pages).
Interview Summary dated Jan. 26, 2006 for related U.S. Appl. No. 10/862,979, filed Jun. 8, 2004, Inventor: Paul J. Rael, (4 pages).
Notice of Allowance dated Apr. 21, 2006 for related U.S. Appl. No. 10/862,979, filed Jun. 8, 2004, Inventor: Paul J. Rael, (4 pages).
Supplemental Notice of Allowance dated Sep. 27, 2006 for related U.S. Appl. No. 10/862,979, filed Jun. 8, 2004, Inventor: Paul J. Rael, (4 pages).
Notice of Allowance dated Nov. 20, 2007 for related U.S. Appl. No. 11/467,856, filed Aug. 28, 2006, Inventor: Paul J. Rael, (7 pages).
Office Action dated Mar. 19, 2009 for related U.S. Appl. No. 12/040,056, filed Feb. 29, 2008, Inventor: Paul J. Rael, (10 pages).
Amendment and Response dated Aug. 19, 2009 for related U.S. Appl. No. 12/040,056, filed Feb. 29, 2008, Inventor: Paul J. Rael, (6 pages).
Notice of Allowance dated Oct. 7, 2009 for related U.S. Appl. No. 12/040,056, filed Feb. 29, 2008, Inventor: Paul J. Rael, (4 pages).
Office Action dated Jun. 21, 2011 for related U.S. Appl. No. 12/710,263, filed Feb. 22, 2010, Inventor: Paul J. Rael, (6 pages).
Amendment and Response dated Oct. 11, 2011 for related U.S. Appl. No. 12/710,263, filed Feb. 22, 2010, Inventor: Paul J. Rael, (7 pages).
Notice of Allowance dated Dec. 23, 2011 for related U.S. Appl. No. 12/710,263, filed Feb. 22, 2010, Inventor: Paul J. Rael, (5 pages).

* cited by examiner

MAGNETIC SAFETY FEATURE FOR COOKWARE AND COOKING STOVES

RELATED APPLICATION DATA

This application is a continuation of U.S. application Ser. No. 12/710,263, filed Apr. 22, 2010 (now U.S. Pat. No. 8,164,029, issued Apr. 24, 2012), which is a continuation of U.S. application Ser. No. 12/040,056 filed Feb. 29, 2008 (now U.S. Pat. No. 7,667,161, issued Feb. 23, 2010), which is a continuation of U.S. application Ser. No. 11/467,856 filed Aug. 28, 2006 (now U.S. Pat. No. 7,355,151, issued Apr. 8, 2008), which claims the benefit of U.S. application Ser. No. 10/862,979, filed Jun. 8, 2004 (now U.S. Pat. No. 7,135,658, issued Nov. 14, 2006), the disclosures of which are hereby incorporated by reference in their entirety.

FIELD OF THE INVENTION

The present invention relates generally to cookware and more particularly to devices for preventing stove top accidents.

BACKGROUND OF THE INVENTION

Cooking stoves, or "ranges" as they are sometimes called, generally comprise a plurality of heating elements, either gas or electric burners, positioned at openings in a generally flat, top surface of the stove. The burners produce heat for heating the contents of a cooking vessel (cookware). Commonly, a grate is positioned over each burner for supporting the cookware over the burner when cooking. The grate usually rests in a depression or opening in the cook top. Many examples of cookware commonly used on a stove consist of a container portion and a handle extending outward from the container. A more recent innovation involves vitroceramic or smooth-top stoves which have burners mounted beneath a substantially flat cooking surface which extends across most, or all, of the cook top.

While cooking stoves are very useful appliances, they also represent a significant danger and are the source of many accidents, including burns and in worst cases, fires. Many of these accidents are caused by the tipping over of cookware on a stove-top causing spilling or splattering of hot contents. If bumped hard enough, the cookware can be knocked completely off the stove top onto the floor. The risk of tip or bumping cookware is exacerbated by the handles which extend out from most cookware used on stoves.

Cookware holding devices for securing cookware on a stove top have been previously described. For example, a stove top pan holding apparatus is described in U.S. Pat. No. 6,517,037, issued Feb. 11, 2003, to Munoz. The pan holder apparatus comprises a fastening means for securing the holder to the stove and a pan holder having a plurality of fastening assemblies for releasably holding the handle of a pan. Several other pan holding devices are described in U.S. Pat. No. 5,574,445, issued Nov. 19, 1996, to Kozdas; U.S. Pat. No. 4,836,181, issued Jun. 6, 1981, to Saga; and U.S. Pat. No. 4,155,343, issued May 22, 1979, to Hartman. Alternative to devices which hold the cookware, guards or shields for preventing children from reaching cookware on a stove top and for blocking splashing, spilling or splattering from the cookware have been described. More specifically, the following patents describe various devices for blocking access to the stove top and for preventing burns from splattering oil, grease, water, food particles, and so on: U.S. Pat. Nos. 4,155,343; 4,314,543; 4,517,955; 4,836,181; and 4,934,333.

These previously known safety devices for preventing stove top accidents are complicated, awkward and inconvenient to use, and interfere with the manipulation of the cookware while cooking.

Accordingly, there is a need for an improved safety device for stove tops which overcomes the deficiencies of previous devices.

SUMMARY OF THE INVENTION

The stove top safety feature of the present invention comprises methods and devices for securing the bottom of an item of cookware to the burner of a stove top by use of magnetism. The magnet(s) may be permanent magnets or electromagnets.

The cookware may comprise a permanent magnet disposed on or in the base of the cookware. The burner comprises a magnetic material such as steel or iron. The magnetic material may be in the grate of the cook top, in the electric coil of an electric burner, in the surface of a smooth-top stove top, or any other component of the cook top which is in close proximity to the bottom of the cookware when it is placed on the cooking surface. When the cookware is placed on the stove top, the magnetic field of the permanent magnet creates a force on the magnetic material tending to bias the cookware against the stove top, thereby securing the cookware to the cook top.

Alternatively, the magnet may be disposed in the cook top of the stove while the cookware comprises a magnetic material in or on its base. The magnet may be a permanent magnet or it may be an electromagnet. If it is an electromagnet, an electric current is applied to create the magnetic field. Again, the magnetic field of the magnet creates a force on the magnetic material in the cookware base biasing the cookware against the stove top.

It should be understood that both the cookware and the cook top may comprise magnets, so long as the polarity of the magnets is configured so that the magnets attract each other rather repel.

DETAILED DESCRIPTION OF THE INVENTION

Figure 1:
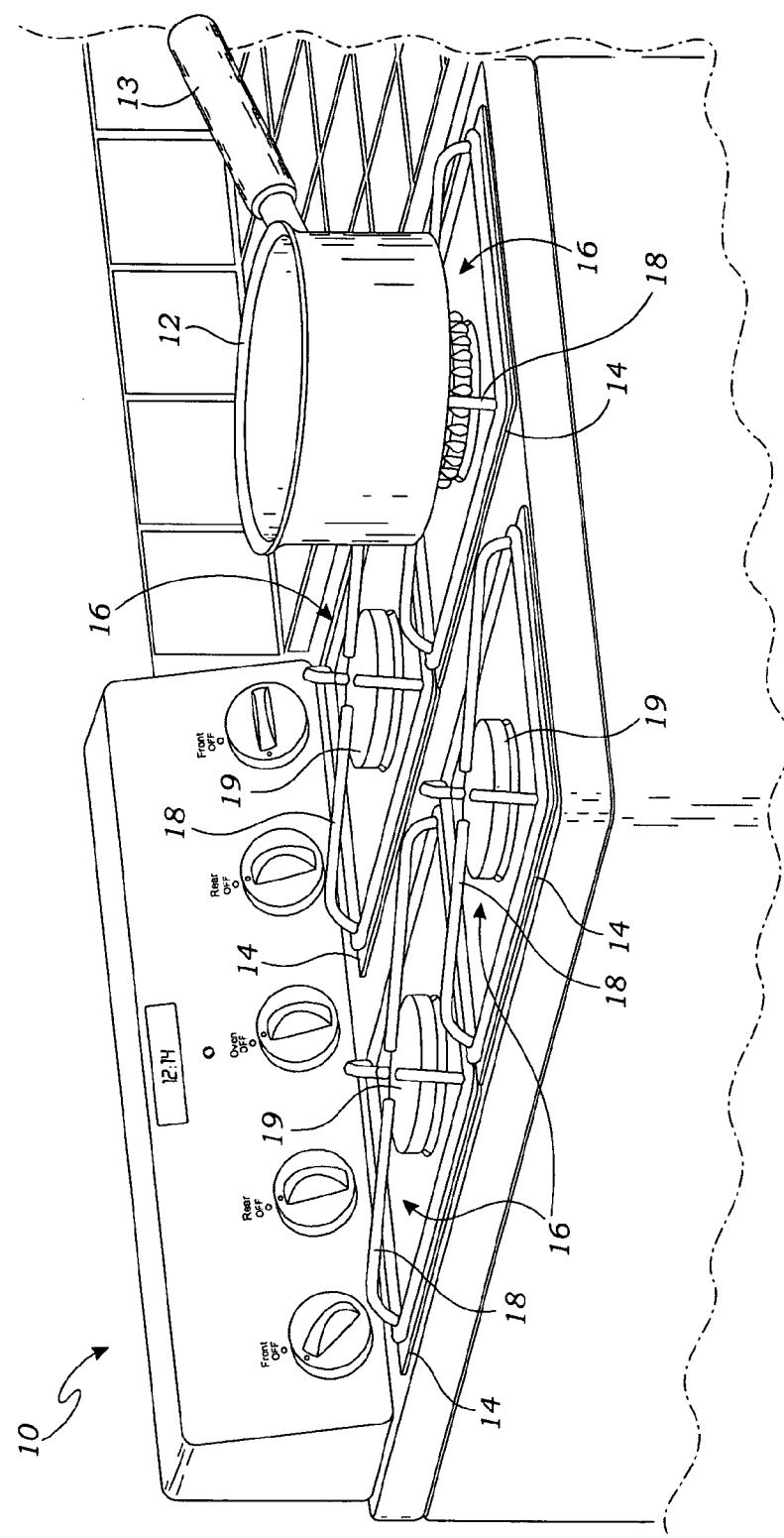
FIG. 1 is a perspective view of a cooking stove and item of cookware according to the present invention.

Turning to FIG. 1, a cooking stove 10 and cooking pot 12 according to the present invention are shown. It is understood that the cooking pot 12 may be any type of cooking vessel including a pot, pan, bowl, each with or without one or more handles 13. The cooking stove 10 comprises a cook top 14 and a plurality of heating stations 16 each positioned at an opening in the cook top 14. Each heating station 16 has a heating element 19 covered by a grate 18.

Figure 2:
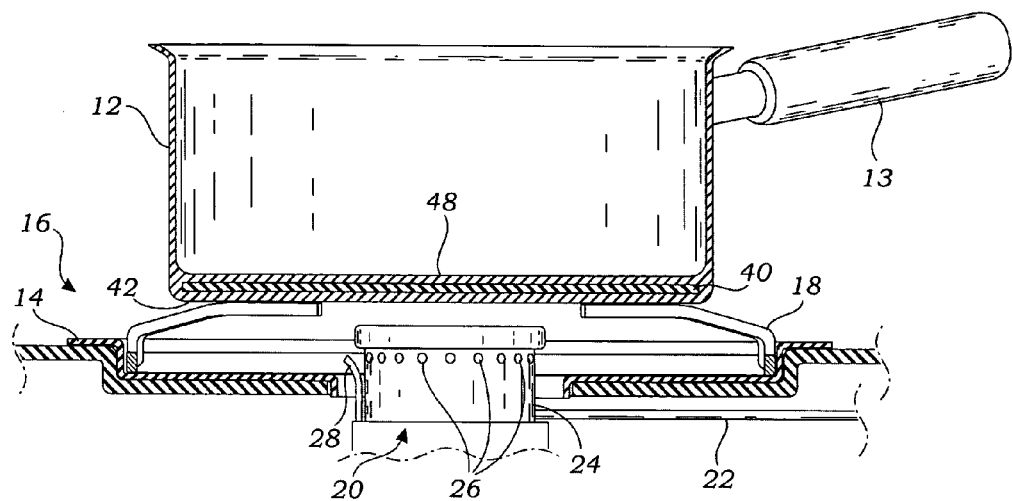
FIG. 2 is an enlarged partial cross-sectional view of one of the heating stations of the cooking stove of FIG. 1 for a gas stove.

The heating elements 19 of the cooking stove 10 may be gas burners, electric burners or other suitable heat source now known or developed in the future. FIG. 2 shows an enlarged partial cross-sectional view of one of the heating stations 16 for a stove 10 having gas burners. The heating element 19 comprises a gas burner assembly 20. The gas burner assembly 20 includes a gas line 22 connected to a burner 24 having a plurality of orifices 26. The gas burner also has a starter 28 which may be a pilot light, flint or other source of spark or heat for lighting the gas burner 20.

Figure 3:
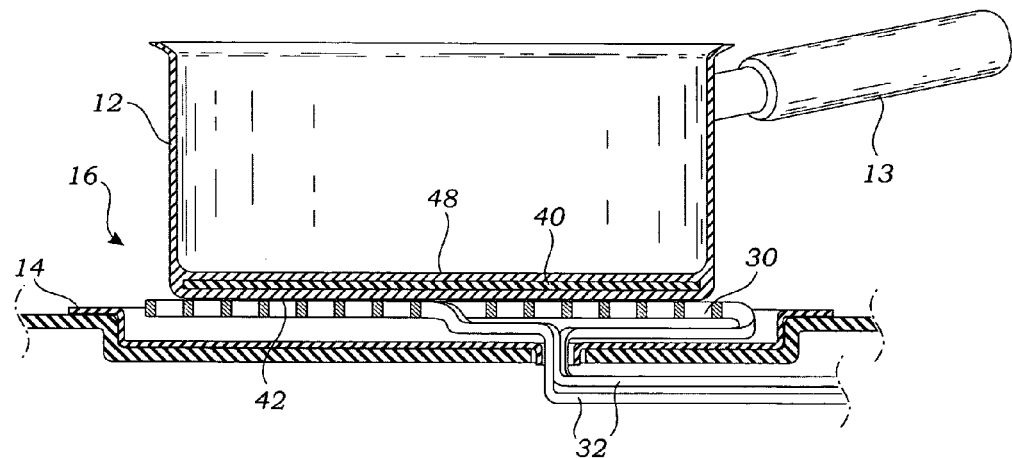
FIG. 3 is an enlarged partial cross-sectional view of one of the heating stations of the cooking stove of FIG. 1 for an electric stove.
Figure 4:
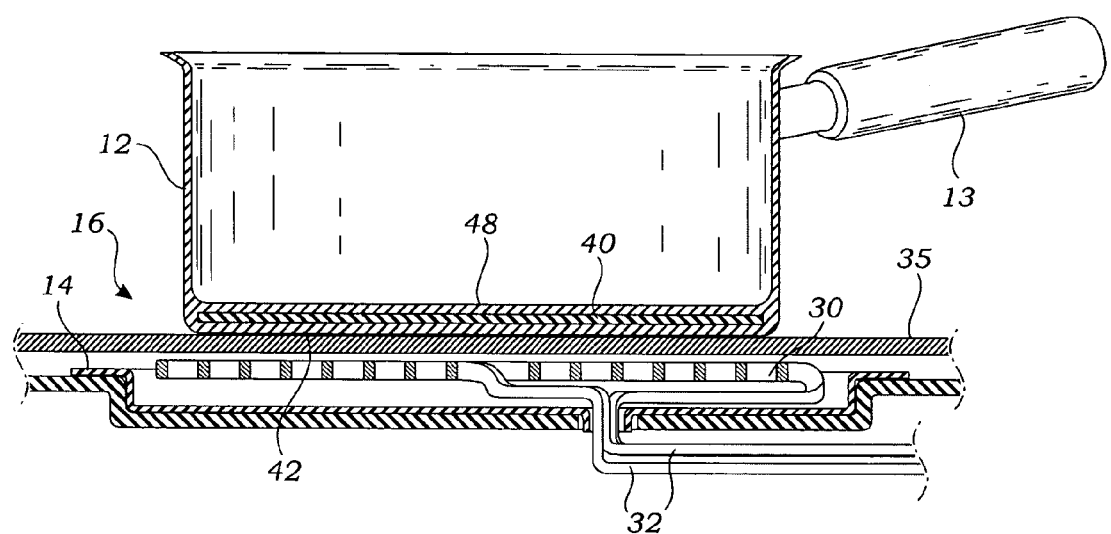
FIG. 4 is an enlarged partial cross-sectional view of one of the heating stations of the cooking stove of FIG. 1 for an electric stove having a smooth top cook top.

FIG. 3 shows an enlarged partial cross-sectional view of one of the heating stations 16 for a stove 10 having electric burners. The heating element 19 comprises an electric heating coil 30. The electric heating coil 30 is connected to electrical leads 32 which are in turn connected to a source of electric power such as an electrical wall outlet. In use, the cooking pot 12 may be placed directly on the heating coil 30 or the heating coil may be covered by a protective cover or grate 34 or even a smooth-top cook top 35 as shown in FIG. 4.

In order to secure the cooking pot 12 to the heating station 16 to prevent the pot 12 from tipping or sliding, the cooking pot 12, the heating station 16, or both, are provided with a magnetic field source 40. The magnetic field source 40 may be one or more permanent magnets or electromagnets. In the case where only one of the cooking pot 12 or the heating station 16 is provided with a magnetic field source 40, the other feature is provided with a magnetizable element 42. The magnetizable element 42 is made of a magnetic material such that in the presence of a magnetic field the magnetic material is magnetized creating a force tending to pull the magnetizable element 42 toward the magnetic field source 40. In the case where both the cooking pot 12 and the heating station 16 are provided with a magnetic field source 40, the polarity of the magnetic field sources 40 must be configured so that they attract each other rather than repel, i.e. the north pole of one of the field sources 40 must be positioned toward the south pole of the other field source 40.

FIG. 2 illustrates a magnetic safety feature according to the present invention in which the cooking pot 12 is provided with a magnetic field source 40 and the heating station comprises a magnetic material. The base 42 of the cooking pot 12 has a multi-layer construction with the magnetic field source 40 encapsulated between the bottom surface 46 of the base 42 and the inside bottom 48 of the pot 12. The cooking pot 12 may be constructed of stainless steel, glass, tempered glass, aluminum or any other suitable material. The grate 18 is made of a magnetizable material such as steel or iron. When the cooking pot 12 is placed onto the grate 18, the magnetic field of the magnetic field source 40 creates a force on the magnetizable material of the grate 18 tending to pull the pot 12 against the grate 18, thereby securing the pot 18 to the cook top 14. The force holding the pot 12 to the grate 18 helps prevent the pot 12 from sliding or tipping if the pot 12 or its handle 13 is inadvertently bumped. Alternatively, the grate 18 could be made with or provided with a magnetic field source 40, and the base 42 of the cooking pot 12 could be provided with or made from a magnetizable material.

Referring again to FIGS. 3 and 4, a magnetic safety feature of the present invention will be described for a cooking stove 10 having electric burners. The cooking pot 12 is identical to the cooking pot 12 described in the previous paragraph. The heating coil 30, the protective cover or grate 34 and/or the smooth-top cook top 35 are made of, or are provided with, a magnetizable material. For example, the smooth top cook top 35 may be a multi-layer construction in which the areas around each heating station 16 are provided with a layer of magnetizable material 50 between an upper layer 52 and a lower layer 54. The upper layer 52 and lower layer 54 may be formed of glass, metal or other suitable heat-resistant material. In an alternative embodiment, the heating coil 30, the protective cover or grate 34 and/or the smooth-top cook top 35 may be provided with a magnetic field source 40 and the cooking pot 12 the base 42 of the cooking pot 12 could be provided with or made from a magnetizable material.

Accordingly, a new and improved stove top safety feature comprising methods and devices for securing an item of cookware to a heating station of a stove top by use of a magnetic field.

While the present invention has been fully described above with particularity and detail in connection with what is presently deemed to be the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed is:

1. An item of cookware for use on a cooking stove having a cooking surface, comprising:
    a base comprising a bottom outer surface and a cooking surface on a top side of the base and a bottom outer surface on the bottom side of the base; and
    an electromagnetic disposed on or in the base, the electromagnetic being adjustable to turn the electromagnet on or off, wherein when the electromagnetic is turned on, the electromagnet produces a magnetic field which is strong enough to hold the cookware against the cooking surface with sufficient force to prevent the cookware from being accidentally bumped off the cooking surface.

2. The cookware of claim 1, wherein the electromagnet is adjustable to adjust the strength of the magnetic field to magnitudes between fully on and fully off.

3. The cookware of claim 1, wherein the electromagnet is disposed between the cooking surface and the bottom outside surface of the base.

4. The cookware of claim 1, wherein the cookware is one of a pot, pan or bowl.

5. The cookware of claim 1, wherein the cookware is constructed of one of stainless steel, glass, tempered glass, aluminum.

6. The cookware of claim 2, wherein the cookware is constructed of one of stainless steel, glass, tempered glass, aluminum.

7. The cookware of claim 2, wherein the cookware is constructed of one of stainless steel, glass, tempered glass, aluminum.

8. A cooking stove, comprising:
    a cook top having at least one heating station;
    said heating station comprising a heating element and a heating surface over said heating element for placing an item of cookware thereon; and
    a magnetic field source disposed in said cook top for creating a magnetic field to create a force tending to bias an item of cookware against said heating surface, said magnetic field source being adjustable such that the strength of the magnetic field at the heating surface may be adjusted to vary said strength and not merely turn the magnetic field on and off.

9. The cooking stove of claim 8 wherein said magnetic field source is a permanent magnet.

10. The cooking stove of claim 8 wherein said magnetic field source is an electromagnet.

11. The cooking stove of claim 8 wherein the adjustability comprises moving the magnetic field source relative to said cooking surface.

12. The cooking stove of claim 8, wherein said heating element is a gas burner.

13. The cooking stove of claim 8, wherein said heating element is an electric burner.

* * * * *